May 2, 1944. G. B. HILL 2,347,907
HARVESTER
Filed March 7, 1941 4 Sheets-Sheet 1

INVENTOR:
GEORGE B. HILL
BY [signature]
ATTORNEYS.

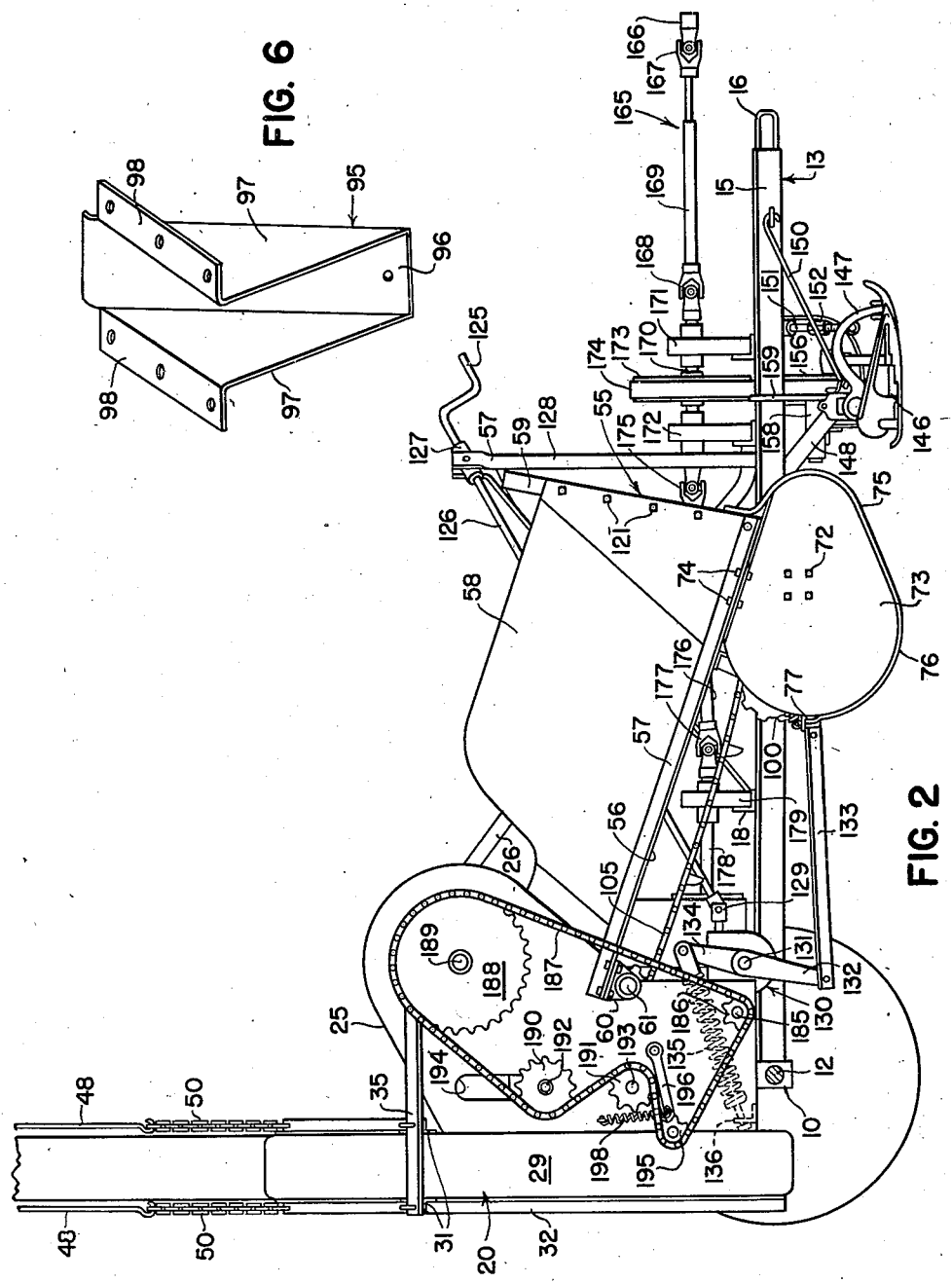

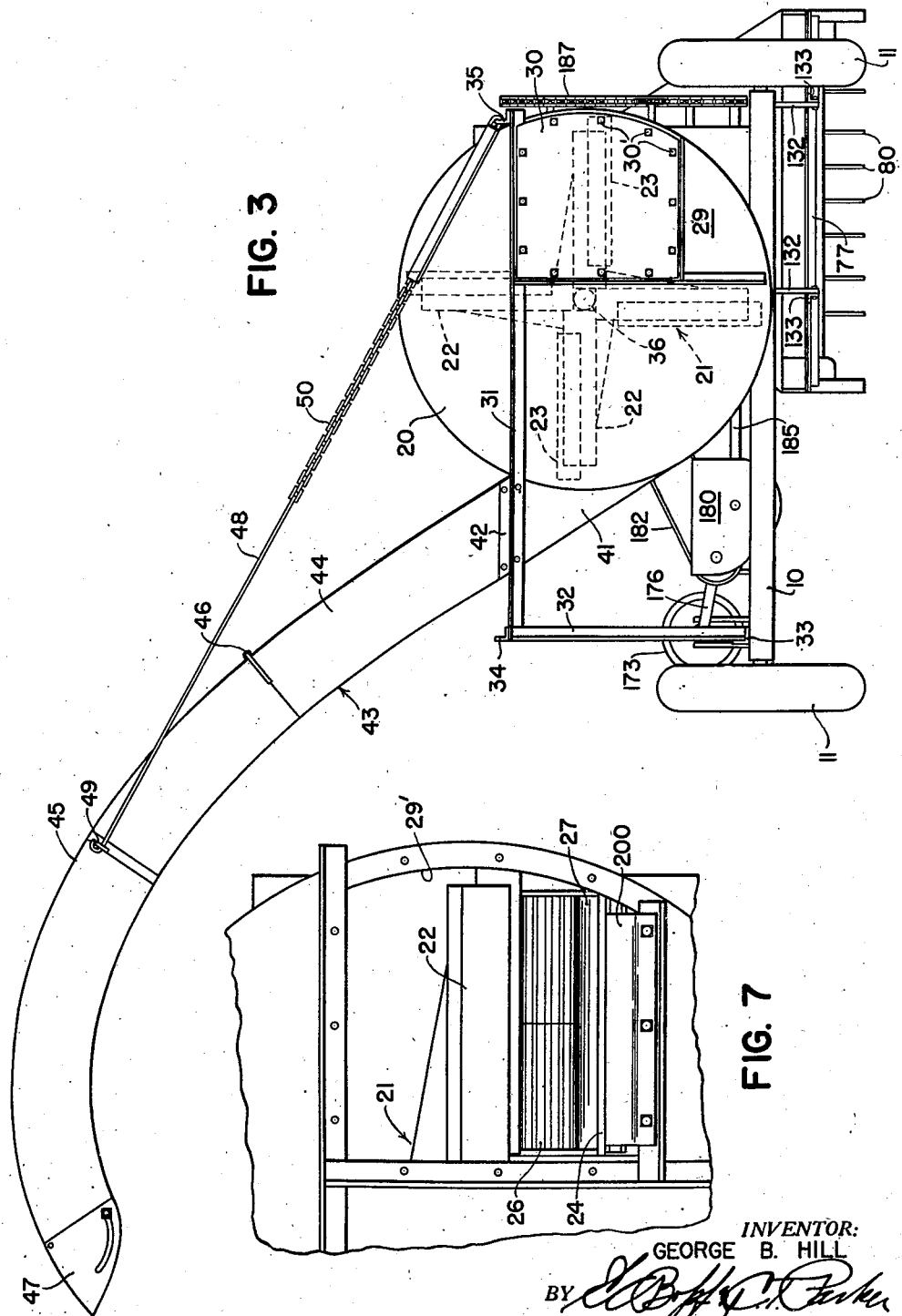

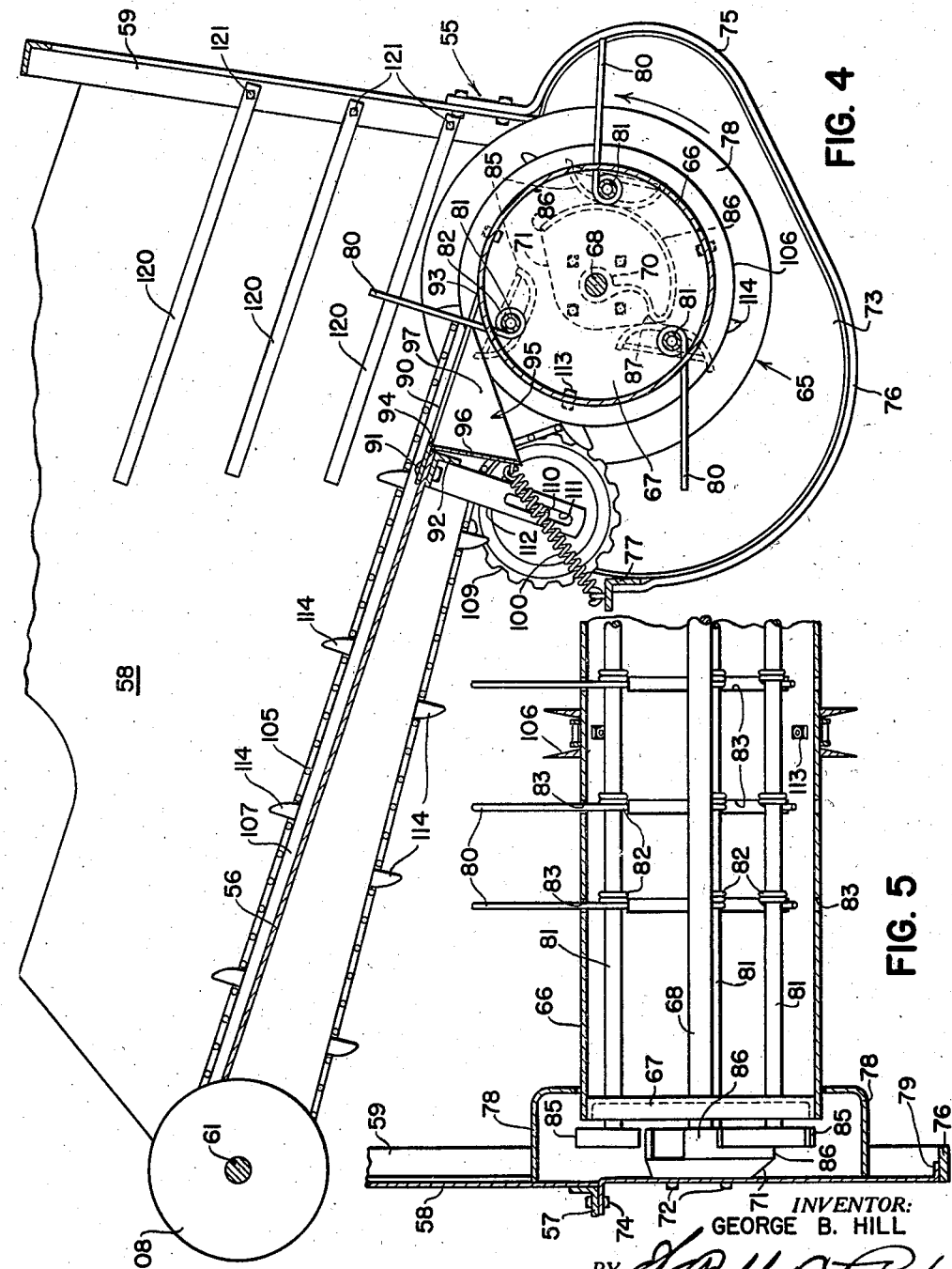

Patented May 2, 1944

2,347,907

UNITED STATES PATENT OFFICE 2,347,907

HARVESTER

George B. Hill, Ottumwa, Iowa, assignor to Dain Manufacturing Company of Iowa, Ottumwa, Iowa, a corporation of Iowa Application March 7, 1941, Serial No. 382,219

17 Claims. (Cl. 56—364)

The present invention relates generaly to harvesting machines and more particularly to machines adapted to harvest, gather, and reduce to silage, green forage crops such as grass, alfalfa and the like, and has for its principal object the provision of a novel and improved harvester and chopper which is efficient in operation, simple in construction, but strong and durable.

A further object of my invention relates to the provision of a harvester in which provision is made for mowing a crop of hay or alfalfa, or the like, dropping it upon the ground to release any stones which may have been dislodged or picked up by the cutter bar, and then picking the crop up from the ground and chopping it into silage.

Still another object relates to the provision of a pick-up mechanism for a harvester of this type, which operates efficiently to pick up green grass, alfalfa, or the like, but which is simple and inexpensive to manufacture.

Still a further object of my invention relates to the provision of means for elevating and conveying the chopped crops from the harvesting machine to a wagon or truck driven alongside the machine, and which is efficient in operation when conveying green grass or alfalfa, without any tendency to clog during operation.

Another object of the present invention has to do with the provision of a harvester platform for raising crops from the ground to a crop treating mechanism without the use of the usual canvas platform conveyors, and is adapted to feed the harvested crops from a comparatively wide swath through a comparatively narrow discharge throat at the crop treating mechanism.

Another object relates to the provision of a harvesting machine which can be quickly and easily converted from an ensilage harvester and chopper to a windrow harvester.

Still another object relates to the provision of driving mechanism for the feed rolls of the machine which compensates for shifting movement of one feed roll relative to the other.

These and other objects and advantages of my invention will be apparent to those skilled in the art after a consideration of the following description, in which reference is had to the drawings appended hereto, in which Figure 1 is a plan view of a harvester embodying the principles of my invention;

Figure 2 is a side elevation as viewed from the grainward side of the machine;

Figure 3 is a rear elevation of the harvesting machine;

Figure 4 is a longitudinal sectional elevation taken along a line 4—4 in Figure 1;

Figure 5 is a partial sectional elevation showing certain of the details of the pick-up mechanism, as viewed from the rear with a portion of the drum broken away.

Figure 6 is a perspective view, drawn to an enlarged scale, of one of the stripper fenders in the pick-up mechanism; and Figure 7 is a fragmentary elevational view of the rear of the machine showing the mechanism exposed with the rear panel removed.

Figure 1:
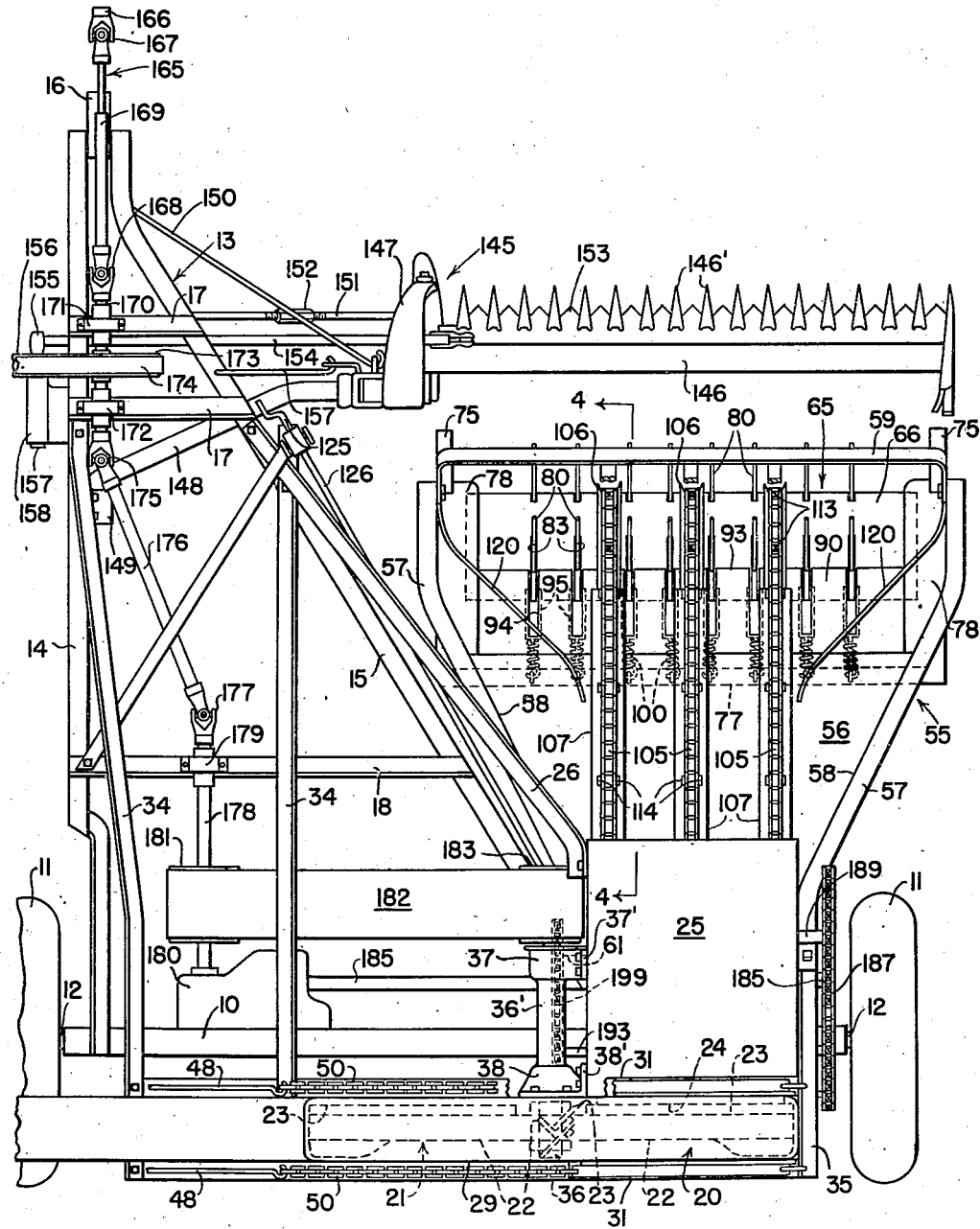

Referring now to the drawings, the harvesting machine includes a transversely disposed supporting axle beam 10, at opposite ends of which are disposed a pair of supporting wheels 11, respectively, journaled on a pair of stub axles 12 fixed to the main axle beam 10. A draft frame, indicated generally by reference numeral 13, extends forwardly from the main axle beam 10, to which it is rigidly connected, and includes a pair of converging draft beams 14, 15, which are connected together at their forward ends in a position offset toward the left side of the implement and carry a tractor hitch member 16 adapted for connection to the drawbar of a tractor or other suitable draft mechanism. The forwardly converging draft members 14, 15 are interconnected by suitable transverse frame members 17, 18, whereby the axle beam 10 and the hitch frame 13 are rigidly connected together to form a unitary frame structure.

Supported at the rear of the implement frame is an ensilage chopper 20 having a rotary chopper 21 of the flywheel type, comprising radially extending arms 22 on which are carried the chopping blades 23. The arms 22 are mounted on a shaft 36 which is journaled in suitable bearings mounted in the enlarged end portions 37 and 38 of a sleeve casting 36'. Flanges 37' and 38' on the casting are bolted or otherwise fixedly secured to the adjacent side of the feeder housing 25 to support the sleeve 36'. The blades 23 cooperate with a suitable stationary cutter bar 24 to chop the harvested crops which are fed thereto by means of suitable feeding mechanism including an upper fluted roll 26 and a smooth lower feed roll 27 (see Figure 7), disposed immediately ahead of the cutter bar 24 and enclosed in a feeder housing 25, which is mounted in fixed relation on the supporting frame. The feeder housing 25 is braced to the hitch frame 13 by a forwardly and outwardly extending bracing member 26, which is inclined downwardly from the corner of the feeder house and is bolted to the draft member 15.

The rotary chopper 21 is contained within a generally circular, vertically disposed housing 29, which is mounted behind the main axle beam 10 and communicates with the feeder housing 25 to admit the harvested crops to the cutter bar 24. The fan housing 29 is bolted to the rear flange 38' of the casting 36' and to the rear edges of the feeder housing walls, and is further supported by a superstructure comprising a pair of transversely disposed frame members 31, fixed to the front and rear sides of the housing 29, respectively, and attached to a pair of vertical supporting members 32 which are carried at their lower ends on a forwardly extending frame member 33 which is fixed to the implement frame. The superstructure is also braced by a pair of forwardly and downwardly inclined bracing beams 34 connected to the transverse beams 31 and extending downwardly to points of connection with the draft frame members 16, 19, respectively. At the opposite side of the housing 29 a frame member 35 is connected with the rear transverse member 31 and extends forwardly and is fixedly attached to the side of the feeder housing 25 and the chopper housing 29. The back wall of the housing 29 is provided with an opening 29' over which a removable panel 30 is secured by bolts 30'.

The arms 22 of the rotor also serve as fan blades for propelling the chopped crops through a tangential discharge duct 41, which extends upwardly and laterally from the stubbleward side of the chopper housing 29. The discharge portion 41 of the housing 29 terminates at the transversely disposed frame members 31 and is provided with a connecting flange 42 to which is connected a discharge conduit 43 extending upwardly and outwardly in a parabolic curve which follows substantially the natural trajectory of the crops as they are discharged from the housing 29 through the discharge duct 41.

The parabolic conduit 43 comprises a pair of sections 44, 45 coupled together by means of a hinge 46 which permits the upper section 45 to be folded back over the top of the rotary chopper housing 29 for transport purposes. The outer end of the conduit 43 is provided with a pivoted hood 47 for controlling the direction of discharge of the crops from the end of the conduit 43. The conduit 43 is closed on three sides, having a top wall and a pair of side walls but no bottom wall. The bottom of the conduit 43 is closed on three sides, having a top wall and a pair of side walls but no bottom wall. The bottom of the conduit 43 is open all the way from the connecting flange 42 to the outer end of the conduit. Thus the discharge conduit 43 serves more as a means for guiding the discharged crop material in its natural trajectory from the rotary chopper 20 to the wagon or truck which is drawn alongside of the harvester, rather than as a pneumatic conveyor pipe. In case the rotary chopper should slow down, the crop material discharged through the conduit would merely follow a lower trajectory curve rather than clogging the conduit and requiring the latter to be dismantled and cleaned out before any further harvesting could be done. I have found that when any shape of discharge conduit other than the parabolic curve described above is used, such as, for example, a straight inclined lower portion with an upper portion which follows a circular arc, the bottom wall of the conduit must be carried up farther than in the parabolic shape of conduit. The reason for this is obvious, since the crop material must be guided on all sides if an attempt is made to make it follow any other path than its natural trajectory, and when the bottom wall is carried up toward the upper end of the conduit, more difficulty is encountered from clogging of the conduit. Thus it is evident that by making the conduit 43 parabolic in form, the bottom wall can be left out entirely right down to the discharge opening in the housing.

The conduit 43 is supported by a pair of tension members 48 connected between the bracing member 35 and a bracket 49 fixed to the outer section 45 of the conduit 43. Each of the supporting members 48 includes a section of flexible chain 50 which permits the outer section 45 to be swung about the hinge 46 for folding the section 45 over the top of the housing 29.

The harvested crops are gathered and conveyed to the feeder housing 25 by means of a forwardly extending platform 55 which is pivotally mounted on the feeder housing 25 by means providing for vertical swinging movement relative thereto about a transversely extending axis. The platform 55 comprises a deck 56 carried on a pair of laterally spaced forwardly diverging frame members 57, upon which are also supported a pair of forwardly diverging side walls 58. The forward ends of the frame members 57 are rigidly connected together by means of a vertically disposed arched frame member 59 which extends over the forward end of the platform. The rear ends of the frame members 57 are provided with bearing members 60 which are journaled at opposite ends of a transversely disposed shaft 61 which is carried in suitable bearings on the feeder housing 25.

Extending across the forward end of the platform 55 is a pick-up device 65 comprising a hollow drum 66 supported on a pair of laterally spaced end plates or spiders 67, which are fixed to a central shaft 68. The shaft 68 is rotatably supported at opposite ends in a pair of journal bearings 70 each of which is formed integrally with a casting 71 which is fixed by means of bolts 72 to a side wall 73. The upper edge of the side wall 73 is connected by bolts 74 to the side frame members 57 and the forward and lower edges of the side wall 73 are fixed to a curved runner 75 which comprises a strap connected at its upper end to the lower portion of the arched frame member 59, from which it bows forwardly and downwardly and then inclines downwardly and rearwardly to a ground engaging lower portion 76. The rear ends of the runners 75 on opposite sides of the platform 55 are interconnected by a transverse frame member 77, thus serving to strengthen the ground runners and prevent them from bending laterally when the implement makes a turn. The walls 73 are provided with inwardly turned flanges 79 which are fixed to the inner sides of the runners 75.

The pick-up drum 66 is provided with a plurality of sets, preferably three, of crop engaging members, each including a row of teeth or fingers 80 attached in laterally spaced arrangement on a shaft 81 supported at opposite ends thereof, respectively, in the end plates 67 of the pick-up drum. Each of the teeth 80 includes a coiled portion 82 encircling the shaft 81 and thus providing for flexibility of the teeth 80, permitting them to deflect angularly with respect to the supporting shaft 81 whenever the ends of the teeth encounter an obstruction on the ground as the implement moves forwardly. The teeth project outwardly through the drum 66 through circumferentially extending slots 83 in the drum, which slots accommodate the angular movement of the teeth relative to the drum.

As the implement moves forwardly, the drum is rotated in a counterclockwise direction, as viewed in Figure 4 so that the teeth are moved forwardly and upwardly in engagement with the crop on the ground, lifting the latter to the deck 56 of the platform 55. While the crop is being picked up, the teeth are normally disposed radially with respect to the drum, but after the crop is on the deck 56, the teeth are withdrawn therefrom with a feathering action by means which will now be described. At either or both ends of each of the shafts 81, but preferably at both ends, are fixed cam following members 85 having curved surfaces adapted to slide upon a cam portion 86, formed integrally with each of the supporting castings 71 and disposed in a circular arc about the axis of the shaft 68. This cam portion 86 is in the shape of a portion of a cylinder and is disposed at the lower and forward portions of the path of the cam followers 85. When the latter are in engagement with the cam 86, they hold the tooth supporting shaft 81 in such a position that the teeth 80 project radially outwardly through the drum 66. Aproximately at the top of the cycle of revolution, however, the cam followers 85 pass over the ends 86' of the cam segment 86, and thereby allowing the tooth supporting shaft 81 to move freely in its bearings in the end plates 67. This allows the teeth 80 to be withdrawn from the crop on the platform with a minimum of disturbance of the latter, the cam followers 85 being free to move unrestrictedly until they reach a point adjacent the bottom of the cycle of revolution, whereupon they engage the rounded leading end 87 of the cam 86, the engagement with which causes the teeth to swing downwardly into a radial crop engaging position.

The cam mechanism is protected by means of a curved housing 78, which is fixed to the deck 56 and curves downwardly and forwardly around the end of the drum 66, the inner end of the housing 78 being turned radially inwardly with just sufficient clearance around the drum to permit rotation of the latter. Each end of the drum is protected by a similar housing 78.

The harvested crops are removed from the pickup drum 66 by means of a scraper plate 90 disposed transversely along the forward edge of the deck 56, which is terminated along a transverse line above and behind the drum. The forward edge of the deck 56 and the rear edge of the scraper plate 90 are fixed by bolts 91 to a transversely disposed frame member 92 supported at opposite ends, respectively, on the side frame members 57. The forward edge 93 of the plate 90 scrapes on the surface of the drum 66 as the latter revolves and serves to prevent grass or leaves from clinging to the drum, as would frequently occur when the crop is wet. The plate 90 is provided with a plurality of slots 94 extending rearwardly from the forward edge 93 in register with each of the teeth 80, to receive the latter as the drum and teeth revolve. Thus it is evident that the teeth 80 are pulled downwardly through the slots 94 and substantially perpendicular to the plate 90, thus cleaning the crop from the teeth with very little of the crop being pulled through the slots.

Occasionally a few blades of grass or leaves will be carried into the slot 94 by one of the teeth 80. To prevent any such material from catching on the upper ends of the slots 94 a stripper fender 95 is provided. The stripper fender comprises a back wall 96, which extends substantially vertically downwardly from the rear end of the slot 94 and has a pair of forwardly extending side walls 97 formed integrally therewith and having outwardly turned flanges 98 which lie against the bottom of the plate 90 and are secured thereto. Each of the teeth 80 as it passes downwardly through the slot 94 and the stripper fender 95, passes closely adjacent the back wall 96 and therefore any crop material which is forced through the slot 94 is swept downwardly through the stripper fender 95 and is then discharged upon the ground. By virtue of the close clearances between the rear wall 96 and the side walls 97 and the teeth 80, it is impossible for crop material to become packed or lodged in the slots or in the stripper fenders.

The forward edge 93 of the plate 90 is urged into scraping contact with the drum 66 by means of a plurality of tension springs 100, connected to the lower ends of the stripper fenders, respectively, and anchored to the transverse frame member 77. Inasmuch as each of the stripper fenders 95 is connected to the plate along opposite edges of each of the slots 94, the pressure of each spring 100 is exerted upon the plate at each side of each slot and thus each section of the plate 90 between each pair of slots is independently held in contact with the drum, insuring a uniform scraping pressure along the entire length of the scraping edge 93.

The harvested crops are raised from the pickup device 65 to the feeder house 25 by means of a plurality of chains 105, which are trained around suitable cooperative sheaves 106 on the outer surface of the drum 66 and extending rearwardly up the deck 56, which is provided with trap bars 107 on which the chains 105 slide. The chains are driven by suitable sheaves 108 fixed to the shaft 61 at the upper end of the platform and the chains return to the drum 66 beneath the deck 56 and over a chain tightener 109. Each of the chain tighteners 109 is in the form of an idler sprocket rotatably supported on a shaft 110 carried in a slot 111 in a bracket 112 extending downwardly from the transverse frame member 92 under the deck 56. The idlers 109 can be adjusted vertically along the slots 111 to adjust the tension of the chains. The chains 105 are driven by the upper sheaves 108 and, in turn, drive the drum 66. Traction is obtained for the chains on the drum by means of bolts 113 which are fixed within the sheaves in the surface of the drum 66. Each of the chains 105 is provided with a series of crop engaging lugs 114 disposed in pairs fixed to opposite sides of the chain and spaced longitudinally thereof.

The three chains 105 are spaced apart as widely as the throat between the upper ends of the side walls 58 at the entrance to the feeder house 25, will permit. The pick-up device 65, however, is appreciably wider than the feeder house 25 and therefore the crop that is picked up at each side of the pick-up device must be crowded inwardly by the rearwardly converging side walls 58 as the crop material is conveyed rearwardly. In the use of platforms of this type it has heretofore been experienced that the crop material at each side of the platform occasionally becomes blocked against the converging side walls and does not freely flow into the feeder housing. I have found a remedy for this condition in the form of a plurality of curved spring bars 120 attached in vertically spaced arrangement to the side frame members 59 at the forward end of the platform by means of bolts 121, the bars 120 curving inwardly and rearwardly toward the chains 105 at a somewhat sharper angle than the angle of convergence of the side walls 58. The bars 120 are unsupported at their front ends and are thus adapted to flex rearwardly as material is crowded against them, but the elasticity of the spring bars causes them to exert a force, when flexed, tending to urge the material toward the chains. Of course, the more material that is packed against the bars 120, the greater is the elastic force tending to urge the material inwardly toward the chains, and thus I have found that the springing or flexing of these arms works effectively in crowding the harvested crops toward the center of the platform into engagement with the chains during operation. It will be noticed that the bars 120 cross over the rear ends of the outer slots 94 in the plate 90 and thus act upon the material as soon as it is discharged from the teeth 80.

The platform 55 is raised and lowered relative to the ground by means of a hand crank 125 on the forward end of a shaft 126 rotatably supported in a bearing 127 carried on trunnions on a vertical standard 128 which is supported on the draft frame 13. The shaft 126 is connected through a universal joint 129 to a worm gear mechanism 130, which is connected to a transversely disposed rock shaft 131 journaled on the implement frame beneath the feeder housing 25. The rock shaft 131 is provided with a pair of downwardly extending arms 132 pivotally connected to a pair of laterally spaced forwardly extending thrust members 133 which are pivoted at their forward ends to the transverse frame member 77. Thus, by turning the handle 125 the worm gear mechanism 130 rotates the rock shaft 131 in either direction to exert a force 133 against the frame member 77 to swing the platform vertically about the axis of the shaft 61. A pair of upwardly extending arms 134 are also fixed to the rock shaft 131 in laterally spaced arrangement and are connected to counterbalancing springs 135 which are anchored to a transversely disposed frame member 136. The springs 135 act in tension tending to raise the platform and thus counterbalancing the weight thereof.

Ahead of the pick-up device 65 is disposed a mower 145 mounted on the draft frame 13 and comprising a cutter bar 146 pivotally mounted on a shoe arch 147 for vertical swinging movement about a fore and aft extending axis. The shoe arch 147 is carried on the end of a drag bar 148 which extends under the draft frame 13 and is pivotally connected at the far side of the latter by a bracket 149 providing for vertical swinging movement in a transversely extending plane. A link 150 connects the outer end of the drag bar 148 with the forward end of the draft frame 13. A tie rod 151 is also pivoted to the shoe arch 147 and extends transversely to the pivotal connection with the draft frame 13 substantially in fore and aft alignment with the pivotal connection of the drag bar 148. A turnbuckle 152 in the tie rod 151 provides for adjustment to prevent the cutter bar from dragging rearwardly. A sickle 153 cooperates with the cutter bar 146 and is reciprocated by means of a pitman 154, which is connected to a crank 155 on a flywheel 156 mounted on a shaft 157 which is journaled in a pedestal bearing 158 rigidly supported on the draft member 14. A supporting link 159, connected between the outer end of the drag arm 48 and the grainward draft frame member 19, limits the extent of downward swinging movement of the drag bar 148. If desired, the mower 155 can be removed and the machine used to pick up crops which have been previously windrowed.

It will be noted that the mower 145 is disposed ahead of the pick-up device 65 far enough so that the crops are dropped to the ground behind the cutter bar 146 before they are picked up by the pick-up device 65. As previously described, this allows any stones which may be scooped up by the guard fingers 146' of the cutter bar 146, to be dropped on the ground before the crop is picked up and thereby preventing the stones from being conveyed into the rotary chopper 20.

Power to operate the mower and the other mechanism on the implement is obtained from the power take-off shaft of the tractor which draws the implement, by means of a power shaft 165 comprising a splined sleeve member 166 adapted to be attached to the tractor power take-off shaft, and is connected through a pair of universal joints 167, 168 and a telescoping shaft section 169 to a shaft 170 journaled in a pair of bearings 171, 172 on the draft frame 13. A pulley 173 is fixed to the shaft 170 and drives the flywheel 156 by means of a belt 174. The shaft 170 is connected through a universal joint 175 to a shaft section 176, which in turn is connected through a universal joint 177 to a power shaft section 178 from which power is taken to operate various parts of the mechanism. The power shaft section 178 is supported in a pedestal bearing 179 mounted on one of the transverse frame members 18 and extends rearwardly therefrom into a gear housing 180. A belt pulley 181 is mounted on the shaft section 178 and is connected by a driving belt 182 to a pulley 183 mounted on the forward end of the rotor shaft 36. The rear end of the shaft section 178 is journaled in the gear housing 180 and is connected by suitable gears (not shown) in the housing 180 to a transversely extending power shaft 185. The shaft 185 extends under the feeder housing 25 and a sprocket 186 is mounted on the end of the shaft 185 which projects beyond the feeder housing. The sprocket 186 drives through a chain 187, which is trained over a large diameter sprocket 188 fixed to the shaft 189 of a feeder (not shown) in the form of a beater of any suitable conventional design for engaging the crops which move upwardly on the platform and directing them to the rotary chopper 20. The chain 187 is also trained around a pair of sprockets 190, 191 fixed on a pair of shafts 192, 193, respectively, which are connected to a pair of feed rollers (not shown) adjacent the cutter bar 24 for feeding the crop to the chopper. The upper shaft 192 is movable vertically within a slot 194 to accommodate vertical movement of the upper feed roller when the amount of crop material varies. The slack in the chain 187 is taken up by means of a chain tightening idler 195 mounted on an arm 196 which is swingably connected to the side of the feeder housing and is biased by means of a spring 198 to take up the slack. The lower feed roller shaft 193 is extended through the opposite side of the housing 25 for driving the drive shaft 61 of the conveyor chains 105 and is connected thereto by a suitable driving chain 199.

Summarizing the method of operation of the harvesting implement, the latter is attached to a tractor which also furnishes power through the power take-off shaft to drive the operating parts of the implement and is drawn forwardly through the field. The mower 145 severs the grass, alfalfa, or other crop, which drops to the ground behind the cutter bar 146 and is picked up by the pick-up device 65, which delivers the crop to the platform deck 56. The chains 105 engage the crop on the deck and convey the crop rearwardly into the feeder house 25 from which the crop material is fed by conventional feeding means into the rotary chopper 20. The chopped ensilage is thrown by centrifugal force and also propelled by the air expelled from the discharge duct 41 of the chopper housing 29, passing through the parabolic discharge conduit 43 into a wagon or truck drawn alongside of the implement.

At times, it is desirable to cut the crop, lay it in a windrow, and allow it to dry or at least to wilt before it is chopped. For this purpose, the power transmitting belt 182 is removed from the pulley 183 and the rear panel 30 is removed by removing bolts 30'. The flywheel cutter 21 is then set with the arms 22 in the position shown in Figure 7, in which position the cutter can be suitably blocked, if necessary. The machine is then run over the field, cutting the crop, raising the latter to the feed rolls, and discharging the crop through the rear opening 29'. The opening 29' is in register with the feed rolls 26, 27 and the latter feed the crop with sufficient force to clear the lower edge of the opening 29'. If desired, a sheet metal apron 200 can be secured to the latter by bolts 30', the apron extending inwardly to the cutter bar 24 to prevent any material from dropping into the housing 29. Since the discharge opening of the feeder housing is appreciably narrower than the width of the front of the platform, the crop will be discharged through the rear opening 29' in a windrow, which can be picked up and chopped in another operation, with the belt 182 and panel 30 in normal position.

I do not intend my invention to be limited to the exact details shown and described herein except as set forth in the claims which follow.

I claim:

1. Pick-up mechanism for a harvester, comprising in combination, a crop receiving platform, a pick-up drum rotatably mounted thereon, and a scraper plate mounted between said platform and said drum and disposed in scraping engagement with said drum and arranged to transfer crops from said drum to said platform.

2. Pick-up mechanism for a harvester, comprising in combination, a crop receiving platform, a pick-up drum rotatably mounted thereon along a transverse end thereof and spaced longitudinally therefrom, a scraper plate mounted on said platform, forming a continuation thereof and disposed in scraping engagement with said drum, and means for biasing said scraper into engagement with the drum in a position in which crops carried up over said drum are stripped therefrom by said plate and deposited on said platform.

3. Pick-up mechanism for a harvester, comprising in combination, a frame, a drum rotatably mounted thereon, a plurality of teeth associated with said drum and rotatable therewith, a crop receiving platform disposed in a plane substantially tangent to said drum and extending rearwardly therefrom, a plate mounted on said frame in scraping engagement with said drum, said plate bridging between said drum and said platform to transfer crops therebetween and having slots in register with said teeth to receive the latter as the drum revolves.

4. Pick-up mechanism for a harvester, comprising in combination, a frame, a drum rotatably mounted thereon and having apertures therein, retractable crop engaging teeth projecting through said apertures and rotatable with said drum, a crop receiving platform disposed in a plane substantially tangent to said drum and extending rearwardly therefrom, a plate mounted on said frame in scraping engagement with said drum, said plate bridging between said drum and said platform to transfer crops therebetween and having slots in register with said teeth to receive the latter as the drum revolves, and means for biasing said plate into engagement with said drum.

5. Pick-up mechanism for a harvester, comprising in combination, a frame, a drum rotatably mounted thereon, a plurality of teeth associated with said drum and rotatable therewith, a crop receiving platform disposed in a plane substantially tangent to said drum and extending rearwardly therefrom, a plate mounted on said frame in scraping engagement with said drum, said plate bridging between said drum and said platform to transfer crops therebetween and having slots in register with said teeth to receive the latter as the drum revolves, and stripper fenders extending below said plates adjacent said slots for preventing crop material from lodging on the edges of the slots.

6. Pick-up mechanism for a harvester, comprising in combination, a frame, a drum rotatably mounted thereon, a plurality of teeth associated with said drum and rotatable therewith, a plate mounted on said frame in scraping engagement with said drum, said plate having slots in register with said teeth to receive the latter as the drum revolves, stripper fenders fixed to said plate and extending below the latter adjacent said slots, and springs attached to said fenders and connected with said frame for biasing said plate into engagement with said drum.

7. Pick-up mechanism for a harvester, comprising in combination, a frame, a drum rotatably mounted thereon, a plurality of teeth associated with said drum and rotatable therewith, a plate mounted on said frame in scraping engagement with said drum, said plate having slots in register with said teeth to receive the latter as the drum revolves, and a stripper fender adjacent each of said slots and comprising a U-shaped guard sheet extending downwardly from the sides and rear end of said slot.

8. A harvester platform comprising a deck, supporting means therefor, a pick-up drum rotatably carried on said deck, teeth associated with said drum and rotatable therewith, a scraper plate disposed behind said drum in scraping engagement therewith, means attaching said plate to said deck and biasing said plate into said scraping engagement, the latter having slots for receiving said teeth as the drum rotates, and means for moving crops from said plate over said deck.

9. A harvester platform comprising a fore and aft extending deck, means at the rear of said deck for pivotally supporting the latter for vertical movement, a transversely disposed pick-up drum rotatably supported at the forward end of said deck, teeth associated with said drum, a scraper plate fixed to said deck behind said drum generally tangential to said drum and in scraping engagement therewith, spring means biasing said plate into said scraping engagement, said plate having slots for receiving said teeth as the drum revolves, and means for conveying crop material from said scraper plate to the rear end of said deck.

10. A harvester platform as set forth in claim 9, in which said conveying means comprises a plurality of endless chains trained around said drum and extending rearwardly therefrom over the scraper plate to the rear of said platform, said chains being adapted to transmit power to rotate said drum.

11. A harvester platform comprising a fore and aft extending deck, the latter being appreciably wider at its forward end than at its rear discharge end, said deck having side walls converging rearwardly to form a discharge throat, crop gathering mechanism extending across the forward end of said platform, endless conveyor means extending from said gathering mechanism rearwardly to said discharge end, the width of said conveyor means being no greater than the width of said discharge throat, and means for guiding the crop gathered at each side of said conveyor means, inwardly to be engaged by the latter, comprising resilient guide rods supported by their forward ends on said side walls and inclined inwardly and rearwardly over said gathering mechanism and unsupported at their inner ends.

12. A harvester platform comprising a fore and aft extending deck, the latter being appreciably wider at its forward end than at its rear discharge end, said deck having side walls converging rearwardly to form a discharge throat, a pick-up drum extending across the forward end of said platform, endless conveyor means trained around said drum and movable rearwardly across said deck into said discharge throat, and means for guiding the part of the crop picked up near the ends of said drum into engagement with said conveyor means, comprising a plurality of vertically spaced resilient rods fixed to at least one of the side walls at their forward ends and extending rearwardly and inwardly from said side walls toward said conveyor means, said rods being unsupported at their inner ends.

13. A harvester platform comprising a fore and aft extending deck, the latter being appreciably wider at its forward end than at its rear discharge end, said deck having side walls converging rearwardly to form a discharge throat, a pick-up drum extending across the forward end of said platform, a scraper plate attached to said deck behind said drum and engaging the latter generally tangentially, means biasing said scraper into scraping engagement with said drum, endless conveyor means trained around said drum and movable rearwardly across said deck into said discharge throat, and means for guiding the part of the crop picked up near the ends of said drum into engagement with said conveyor means, comprising a plurality of vertically spaced resilient rods fixed to at least one of the side walls at their forward ends and extending rearwardly and inwardly from said side walls toward said conveyor means, said rods being unsupported at their inner ends.

14. In combination, a harvester platform, a pick-up drum rotatably carried at the front end of said platform and having a plurality of crop engaging teeth associated therewith, a scraper plate attached to said platform and disposed in scraping engagement with said drum, said plate being slotted to receive said teeth as the drum revolves and providing a plurality of independently flexing plate sections, and a plurality of springs connected between said plates and said platform for biasing each of said plate sections into said scraping engagement with said drum.

15. In combination, a harvester platform, a pick-up drum rotatably mounted thereon in a position in which the plane of the platform is substantially tangent to the top side of the drum, a scraper mounted on said platform between the latter and said drum and disposed in scraping engagement with said drum, and a plurality of chains trained around said drum and extending across said plate and having crop engaging fingers adapted to lift crops up over said drum and convey them across said plate to said platform.

16. In combination, a harvester platform, a pick-up drum rotatably mounted along the forward end thereof, in a position in which the plane of the platform is substantially tangent to the top side of the drum, a scraper plate attached to said platform between the latter and said drum and disposed in scraping engagement with said drum, a plurality of endless chains trained over said drum and extending rearwardly over said scraper plate and across said platform, and a power driven member at the rear of said platform over which said chains are trained, for driving said chains and said drum.

17. Pick-up mechanism for a harvester, comprising in combination, a crop-receiving platform, a pick-up drum rotatably mounted thereon, a scraper plate mounted between said platform and said drum and disposed in scraping engagement with said drum and arranged to transfer crops from said drum to said platform, and flexible endless conveyor means trained around said drum and movable from the latter over said plate and platform.

GEORGE B. HILL.